Patented Mar. 19, 1935

1,994,753

UNITED STATES PATENT OFFICE 1,994,753

POTENTIALLY REACTIVE PHENOLIC CONDENSATION PRODUCTS AND METHOD OF PREPARING SAME

Oscar A. Cherry, Chicago, Ill., assignor to Economy Fuse and Manufacturing Company, Chicago, Ill., a corporation of New York No Drawing. Application April 28, 1930,
Serial No. 448,158

4 Claims. (Cl. 260—4)

This invention relates to phenolic condensation products of the type adapted to be hardened by the action of heat, and more particularly to phenolic condensation products peculiarly adapted for use admixed with fillers as compositions for hot molding operations, wherein objects are formed and hardened by the combined action of heat and pressure.

This invention relates further to a process for preparing potentially reactive phenolic products of the above described type.

An object of the present invention is to provide an economical, rapid method for preparing such products.

Another object is to prepare a product suitable for use in hot molding operations, said product possessing to a marked degree properties which render it superior to other known products of a similar type.

Another object is to provide a method whereby cheap phenolic bodies now generally regarded as unsuitable for hot molding operations may be used.

It is well known that in order to prepare infusible and insoluble phenolic condensation products possessing a maximum degree of resistivity and strength a basic condensing agent must be used at least in the final stages of the reaction.

It is preferable to use the basic condensing agent in the initial stages as well.

Among the basic condensing agents heretofore proposed are fixed bases such as caustic soda, caustic potash or slaked lime, volatile bases such as ammonium hydroxide, organic bases such as aniline or pyridine and basic salts such as sodium sulfite, sodium acetate, sodium borate and the like. Each class of basic condensing agent has its own specific effect in promoting the reaction between phenol and formaldehyde, and furthermore, there are slight differences in the effects of the individual members of each group as above divided.

As above stated, it is well known that the use of basic condensing agents in contradistinction to acidic condensing agents results in a final infusible product possessing a high degree of chemical and mechanical resistance. It has been further pointed out by Sato (J. Chem. Ind. Japan, 1921, 321) that caustic soda and ammonia differ as condensing agents in that the use of the fixed base results in a stronger product.

When an attempt is made to apply these teachings to the large scale manufacture of phenolic condensation products for use in hot molding compositions numerous difficulties are encountered, and certain defects in the products are found.

A phenolic condensation product for use in hot molding compositions must have certain other properties in addition to that of being heat indurable to form a strong molded object. The resinous product must be of such a nature that when subjected to heat and pressure, it will impart to the molding mixture a degree of thermoplasticity sufficient to cause the mixture to flow to all parts of the mold before the hardening reaction has proceeded to the point at which the mixture possesses no thermoplasticity. On the other hand, the fluidity of the resin at an elevated temperature must not be such as to cause it to separate from the filler and be extruded from the mold.

In order to better understand the present invention, several known and possible methods of producing hot molding phenol formaldehyde compositions will hereinafter be given with an explanation of the behavior of each and the characterizing properties of the products obtained. The first method described will involve the utilization of the primary reaction products obtained by reacting phenol and formaldehyde in the presence of a fixed base.

When phenol and formaldehyde are caused to react in the presence of a fixed base such as caustic soda, the first products of the reaction are apparently phenol alcohols, which are water-soluble, crystalline bodies.

A solution of phenol alcohols so prepared may be used to impregnate filling materials such as wood flour to form a molding composition. It is desirable to add a small amount of reactive methylene substance at this time. The mixing of the phenol alcohol solution with the filler may take place in a kneading machine. The composition as obtained may be dried at a low temperature and then molded under heat and pressure. The composition sets rapidly in the mold to form articles possessing exceptionally high mechanical strength and heat resistivity.

However, due to production of water by the condensation of the phenol alcohols during the molding operation, the articles formed exhibit a tendency to blister upon removal from the mold unless the mold is chilled previous to the removal operation. Furthermore, there is a considerable shrinkage so that it is difficult to hold dimensions with a great degree of accuracy. Possibly due to the elimination of water from the surface of the molded articles when removed from the mold, while hot, and possibly due to the excessive shrinkage above mentioned, the articles do not possess a lustrous smooth surface.

Another objection to this process is the fact that the molding composition so prepared has a very low apparent specific gravity which requires, with the utilization of this composition, molds having a relatively deep cavity in order that the relatively large amount of material required to make the compressed articles may be contained therein.

It is usual in the art to briquette or roughly preform molding powders before the hot pressing operation. The depth of cavity may thereby be reduced, but, with the powder above described, difficulty is encountered in making the preforms or pills. On account of its low apparent specific gravity the material does not feed well into automatic preforming machines, and the same difficulty as to depth of cavity is met with.

If an attempt is made to work the powder into a more dense form by means of heated mixing rolls it is found that the material is too thermoplastic to permit commercial work. The material does not stick to either roll, and it is practically impossible to form sheets which may be ground to form a relatively dense powder.

I will now describe a method of preparing hot molding compositions involving the utilization of the secondary reaction products obtained by reacting phenol and formaldehyde in the presence of a fixed base.

If, instead of using the solution of phenol alcohols formed as the result of the initial reaction between phenol and formaldehyde in the presence of a fixed base, the reaction is carried by appropriate heat treatment to the point where separation of water occurs and a resin containing uncombined methylene groups is formed, other difficulties are encountered.

It is practically impossible in large scale operations to free this product from water in order to obtain a product suitable for incorporation with fillers on heated mixing rolls. As is well known in the art, attempts at dehydration result almost invariably in a worthless, rubbery product.

The product containing some water may be mixed with fillers in a kneading machine with the aid of volatile solvents such as alcohol. The composition may be dried, preferably at a low temperature, and may then be used for hot molding. However, this product has also a very low apparent specific gravity and is subject to the disadvantages aforementioned. But the composition may be worked on mixing rolls successfully to form sheets which may then be ground to form a composition possessing the requisite apparent specific gravity for commercial molding operations.

On molding this composition very strong, resistant articles may be obtained. They are superior in appearance to those obtained from the previously described composition. However, great care is necessary in order to obtain the above results. The composition hardens so rapidly that it is necessary, after filling the mold cavity with powder, to close the mold extremely rapidly. Otherwise the composition hardens to such an extent that the particles do not coalesce under the application of pressure. The result in that case is a molded object with mealy edges and/or an incompletely formed object.

Furthermore, the thermoplasticity of the composition is so low that only objects requiring a minimum of thermoplastic flow for their formation may be successfully molded.

Reactions employing basic salts such as sodium acetate, sodium sulfite, etc., constitute still further, methods for preparing hot molding compositions, and these basic salts are somewhat similar to fixed bases in their catalytic effect. If the reaction be stopped at an early stage and the product mixed with fillers, a composition similar to the phenol alcohol composition above described is obtained. If the reaction is allowed to proceed to a relatively advanced stage before the molding operation, the same difficulties are met with as in the second case above described. In neither case are objects obtained which possess the same high strength and resistivity as when fixed bases such as caustic soda are used.

Treating now a still further method, it is found, when ammonia is used as the condensing agent, a product differing in many respects is obtained. For example, if 2 gram mols. of phenol be reacted with 2⅓ gram mols. of formaldehyde after the addition of ⅖ gram mols. of ammonium hydroxide a very viscous, amber colored product is obtained. This product may be mixed with fillers on mixing rolls with or without a preliminary mixing operation in a kneading machine with the aid of solvents.

The composition so formed has the requisite apparent specific gravity for efficient molding operations. Although it hardens fairly rapidly, it does not harden so rapidly as to cause the production of incompletely formed objects or the production of objects having mealy edges. The thermoplastic flow is such, however, that only objects requiring little flow may be molded.

If, in the above example wherein ammonia is used as the catalytic agent, the proportion of formaldehyde be reduced, to 2 1/7 gram mols. a resinous product is obtained, which, when mixed with fillers, affords a composition having sufficient amount of thermoplastic flow to meet practically any commercial need.

In both cases, however, the compositions exhibit a tendency to stick to the mold in spite of the introduction of known lubricants. The mechanical strength is sufficient to fill practically all commercial requirements, but is not so great as that obtained by the use of fixed bases.

In another respect the compositions show a serious defect. Molded objects produced from them are very lacking in heat resistance. That is to say, their strength is greatly affected by a rise in temperature. For example, standard test bars made from compositions containing condensation products resulting from the catalytic action of fixed bases show a distortion of 10/1000 of an inch under standard conditions at about 150° C. But when ammonia is used as the condensing agent the standard test pieces show the same distortion at a temperature of about 110° C.

We will now consider those methods involving the use of homologs of phenol instead of pure phenol. When, instead of pure phenol, homologs of phenol such as mixtures of meta and para cresol and xylenols are used, the difference in the catalytic effects of fixed bases and ammonia are even more marked.

When fixed bases are used with the higher boiling homologs, objects possessing a relatively high strength may be obtained, but the same difficulties due to premature curing are obtained as when pure phenol is used. When ammonia is used as the catalytic agent, the strength of the molded objects is such as to fit them only for those applications wherein mechanical strength and heat resistivity are unimportant. Furthermore, the rate of induration is so slow as to make relatively long heat treatment under pressure necessary.

When mixtures of phenol and the higher boiling homologs are used, the results obtained are intermediate between those obtained when phenol and a mixture of higher boiling homologs, respectively, are used.

Organic bases such as aniline differ from both ammonia and fixed bases in their catalytic action. Aniline in small amounts does not cause a very rapid rate of reaction between phenol and formaldehyde and it is impossible using small amounts of aniline as the catalytic agent to carry the reaction between phenols and formaldehyde mixed in equal proportions by weight sufficiently far to fix all the formaldehyde in a non-volatile form without obtaining a rubbery product.

When large amounts of aniline are used as the condensing agent, a product which softens at a high temperature is obtained. Thus it has been proposed (see U. S. Patent No. 1,133,083) to incorporate considerable amounts of aniline in phenolic condensation products in order that the final infusible product will still possess the property of softening under heat.

As disclosed in the co-pending application of Franz Kurath and Oscar A. Cherry, Serial No. 378,561, filed July 15th, 1929, it has been discovered that the defects inherent in the use of either ammonia or fixed bases could be remedied by the use of ammonia and a fixed base simultaneously.

Now I have found that for certain purposes the products obtained by the action of formaldehyde on phenol in the presence of both a fixed base and aniline are more suitable than similar products made in the presence of a fixed base and ammonia.

The products made in the presence of a fixed base and aniline are in general faster hardening than similar products made in the presence of a fixed base and ammonia. In addition they possess the property of hardening at a somewhat lower temperature.

The substitution of aniline for ammonia is particularly advantageous when mixtures of phenol and its higher boiling homologs are used as the phenolic body. Higher strengths and faster hardening are thereby obtained. As illustrations of the way in which the reaction may be carried out, the following examples are given.

Ninety four parts by weight of phenol which have previously been liquefied by the addition of 10 parts of water, 100 parts by weight of cresylic acid (distilling between 200° and 220° C.) 184 parts by weight of commercial 40% formaldehyde, 2 parts by weight of slaked lime and 10 parts by weight of aniline are heated to boiling under a reflux condenser. The reaction which ensues is exothermic and it is necessary to cool the mixture when large batches are made. When the initial reaction has subsided heat is again employed to obtain gentle boiling of the mixture. The boiling is continued until the odor of formaldehyde has disappeared. This point is usually reached in about one hour after the beginning of the initial reaction.

It will be noted that about 1.1 mols. of formaldehyde have been combined with each mol. of phenolic body. This is a greater proportion than could have been combined had ammonia alone or aniline alone been used as the condensing agent. In consequence of the relatively large proportion of combined formaldehyde the product, although sufficiently fusible for mixing with fillers, is fast hardening and little time is required in the hot mold effecting the conversion to the final infusible, insoluble form.

The product so obtained may be freed from water mechanically or otherwise. It is preferably mixed with fillers, dyes, lubricants, etc., with the aid of volatile solvents and then, after drying the composition, is preferably mixed on heated mixing rolls to obtain sheets which may be ground to form the molding composition.

As before stated, the strengths obtainable by this procedure are comparable with those of compositions made with the use of pure phenol. As far as I am aware, it is not possible to obtain these strengths by the use of any other combination of catalysts when phenol is replaced to this extent by its higher boiling homologs, particularly the xylenols.

Objects having strengths less than those above described but having strength sufficient for most commercial requirements, may be obtained from phenolic mixtures containing no phenol, provided the described combination of condensing agents be used. As disclosed in the co-pending application above mentioned, similar results may be obtained by the use of a fixed base and ammonia simultaneously as condensing agents. The product obtained by the use of aniline and a fixed base differ from that product chiefly in being somewhat faster heat setting.

The reaction when using a phenolic mixture containing no phenol and distilling between 200 and 220° C. is carried out in the manner above described. The proportions of the reactants may be, by way of example, 200 parts by weight of cresylic acid, 162 parts by weight of 40% formaldehyde, 10 parts by weight of aniline and 1 part by weight of caustic soda.

The proportions of aniline to fixed base are purely illustrative and may be varied to produce desired results. An increase in the ratio of aniline to fixed base results in a slower heat setting product and one possessing a greater thermo-plasticity. A decrease in the ratio of aniline to fixed base results in a faster heat setting product and especially faster heat setting at lower temperatures than are ordinarily used in the commercial hot molding of phenolic condensation products.

An increase in ratio of the total condensing agent to phenolic body results in a faster reaction but it is not ordinarily desirable to increase the ratio greatly over that described. Smaller amounts may be used but if the amount be greatly reduced, some difficulty will be encountered in combining all the formaldehyde without obtaining a rubbery product. Accordingly, the term "substantially six per cent by weight of the phenol", defining in the appended claims the quantity of combined condensing agent, is not to be strictly construed as an exact limitation but rather as covering some variation above and below, within limits and according to which the results of this invention will be realized.

It is to be understood, of course, that aniline may be replaced by its obvious chemical equivalents, such as for example, ortho-toluidine, or other primary aromatic amines.

In the above description and in the appended claims, I speak of conducting the reaction in the presence of a fixed base and aniline, but it is to be understood that the term formaldehyde and aniline as employed, is to be construed as including their existence in the form of anhydroformaldehyde aniline or other compound or compounds of aniline and formaldehyde that might be formed under the conditions of the reaction.

The term formaldehyde, as used in the specification and claims, should also be understood to include the polymers of formaldehyde, which may be considered the equivalents for the purposes of this invention.

The term "phenol" as used in the appended claims is intended to include pure phenols and/or a mixture of phenols.

I claim:

1. The process of producing a potentially reactive condensation product which comprises reacting a phenol with formaldehyde in the presence of a condensing agent comprising a fixed base and aniline in combined proportion of substantially six per cent by weight, of the phenol.

2. A potentially reactive phenolic condensation product, comprising the following substances, first; a reaction product of a phenol and formaldehyde characterized by having been reacted in the presence of a quantity of fixed base and aniline in proportion of substantially 6 per cent by weight, of the phenol employed, secondly; reactive methylene groups and thirdly, condensing agent of a fixed base and aniline in quantity not exceeding substantially 6 per cent by weight, of the phenol originally employed.

3. The process of producing a potentially reactive condensation product suitable for hot molding which comprises reacting substantially 94 parts by weight of phenol liquefied in substantially 10 parts of water, substantially 100 parts by weight of cresylic acid distilling between 200° and 220° C. and substantially 184 parts by weight of commercial 40% formaldehyde in the presence of substantially 2 parts by weight of slaked lime and substantially 10 parts by weight of aniline.

4. The process of producing a potentially reactive condensation product suitable for hot molding which comprises reacting substantially 200 parts by weight of cresylic acid and substantially 162 parts by weight of 40% formaldehyde in the presence of substantially 10 parts by weight of aniline and substantially 1 part by weight of caustic soda.

OSCAR A. CHERRY.